United States Patent [19]

Bae

[11] Patent Number: 5,282,048

[45] Date of Patent: Jan. 25, 1994

[54] AUTOMATIC SELECTION METHOD AND APPARATUS FOR A VIDEO SIGNAL DURING DUBBING

[75] Inventor: Seong-ki Bae, Suwon, Rep. of Korea

[73] Assignee: Samsung Electronics Co., Ltd., Rep. of Korea

[21] Appl. No.: 831,414

[22] Filed: Jan. 29, 1992

[30] Foreign Application Priority Data

Jan. 29, 1991 [KR] Rep. of Korea .................. 91-1514

[51] Int. Cl.$^5$ ............................................ H04N 5/782
[52] U.S. Cl. .................................................. 358/335
[58] Field of Search ............... 358/335, 336, 185, 181, 358/311, 314; 360/14.1, 14.3, 15, 38.1, 61

[56] References Cited

U.S. PATENT DOCUMENTS

| | | |
|---|---|---|
| 4,179,712 | 12/1979 | Opelt . |
| 4,528,600 | 7/1985 | Ishiguro et al. . |
| 4,618,895 | 10/1986 | Wright . |
| 5,161,019 | 11/1992 | Emanuel ......................... 358/336 |

Primary Examiner—Donald E. McElheny, Jr.
Attorney, Agent, or Firm—Sughrue, Mion, Zinn, Macpeak & Seas

[57] ABSTRACT

An image recording/reproducing apparatus for automatically selecting a video signal during dubbing operations includes an input device for applying a user command, a path control device for selecting one of a source video signal output by a video signal source and an external video signal applied to an input/output terminal to permit the selected video signal to be applied to a record/playback processor, a signal presence detector for detecting whether the external video signal applied to said input/output terminal is present in response to a dubbing mode request command applied by the input device and a microcomputer for controlling the path control device based on output signals of the signal presence detector and the input device. According to one aspect of the present invention, the apparatus can be included in a VCR having a camera or a broadcast receiving apparatus, whereby the apparatus selects one of an external video signal or an output from the camera or broadcasting receiving apparatus. A method for automatic selection of a video signal includes a dubbing mode request recognizing step for identifying a request for setting up a dubbing mode and a selection step for selecting either the video signal from the video signal source or the video signal from an external source based on the user's selection and the presence of an external video signal, once the dubbing mode has been requested.

10 Claims, 3 Drawing Sheets

AUTOMATIC SELECTION METHOD AND APPARATUS FOR A VIDEO SIGNAL DURING DUBBING

FIELD OF THE INVENTION

The present invention relates to an apparatus for recording video signals and, more specifically, to an apparatus for automatic selection of a video signal to be recorded during a dubbing operation in an image recording reproducing system including at least one of a broadcast receiving device and a camera. The present invention advantageously includes a method for automatically selecting a video signal to be recorded during the dubbing operation performed by an image reproducing system.

BACKGROUND OF THE INVENTION

Generally, a common video cassette recorder (hereinafter referred to as a "VCR") and a VCR provided with a video camera (hereinafter referred to as a "camcorder") are both known as image record/reproducing systems which can be connected to a broadcast receiving device. The conventional record/reproducing apparatus incorporates an input/output terminal for input of a video signal from an external source, components for recording the signal onto a recording medium, and circuitry for transmitting the reproduced video signal. The VCR or camcorder is provided with a dubbing function for inserting a pictorial image into video programs.

Particularly when the camcorder is performing the dubbing function, it has only been possible to record a video signal input from an external source but never that from a video camera. In other words, when it is desired to perform the dubbing function during playback, the camcorder mode of operation is changed from the VCR mode to a still mode, and the camcorder selects and records an external input signal when a dubbing key is operated in the still mode. It is therefore impossible for the camcorder, during dubbing, to select a signal output from the video camera because the camcorder lacks the capability to concurrently set both the playback and recording modes.

The present-day VCR is able to selectively record video signals input from either an external source during dubbing or video signals generated by a broadcast receiving apparatus in accordance with the user's selection. However, there is another problem with both the above-mentioned devices in that, while the dubbing operation is being carried out while no external signal is present, only the noise present at the input/output terminal is recorded on the recording medium.

SUMMARY OF THE INVENTION

Accordingly, it is the object of the present invention to provide an apparatus and method for automatic selection of a video signal in an image record/reproducing system having a video signal source input terminal so as to automatically select and record either a video signal of the video signal source or one input from an external source during a dubbing operation.

To achieve the previously described object of automatic selection of a video signal during a dubbing operation in an image record/reproducing system having a video signal source, an automatic selection method comprises the steps of:

recognizing a dubbing mode request;

when the dubbing mode has been requested, selecting a video signal from either a video signal source or an external source in response to both a user's signal selection request and the presence or absence of an external video signal; and recording the selected video signal.

In order to execute the previously described video signal automatic selection method, there is provided a video signal automatic selection apparatus for an image record/reproducing system having a video signal source, an input/output terminal for the input and output of the video signal to and from an external source, and a record/playback processor for recording or reproducing a selected video signal. The recording/reproducing system comprises;

an input device for applying a command signal designated by a user;

a path control device for selecting one of a signal output from the video signal source and a signal applied at the input/output terminal so that the selected signal is output to the record/playback processor;

a signal presence detection device for detecting whether a video signal supplied from the input/output terminal is present or not when a dubbing mode request command has been applied from the input means; and a microcomputer for controlling the path control device using signals from the signal presence detection device and the input device.

BRIEF DESCRIPTION OF THE DRAWINGS

For a better understanding of the invention, and to show how the same may be carried into effect, reference will now be made by way of example, to the accompanying drawings, in which.

DESCRIPTION OF THE PREFERRED EMBODIMENT

Figure 1A:
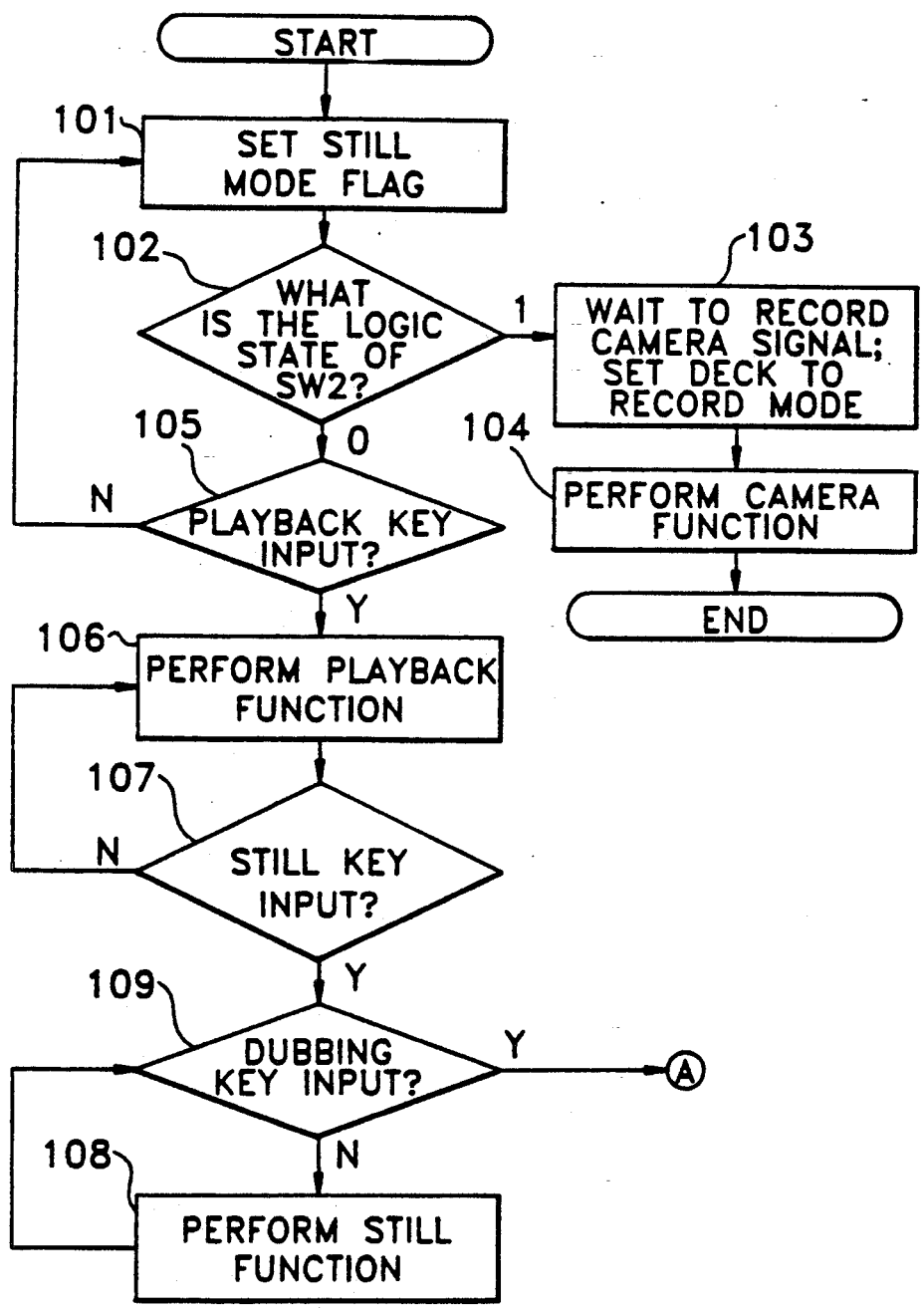
FIGS. 1A and 1B are a flowchart for explaining a video signal selecting method during a dubbing operation in accordance with the present invention.
Figure 1B:
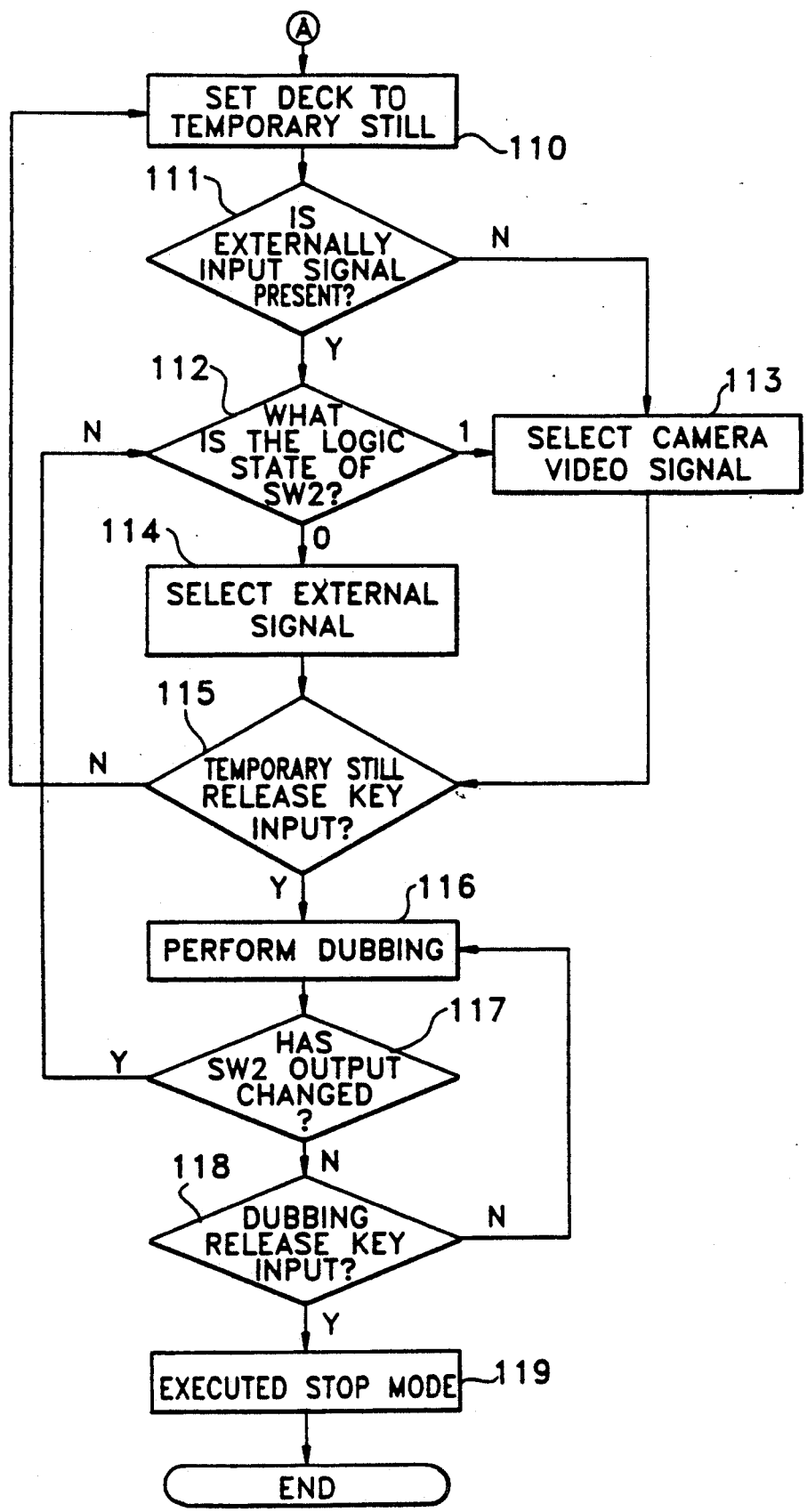

Referring to FIGS. 1A and 1B, steps 101 through 109 represent the process for dubbing mode recognition, while steps 110 through 114 represent the process for signal selection, and steps 115 through 119 represent the steps associated with the selected signal recording process.

Figure 2:
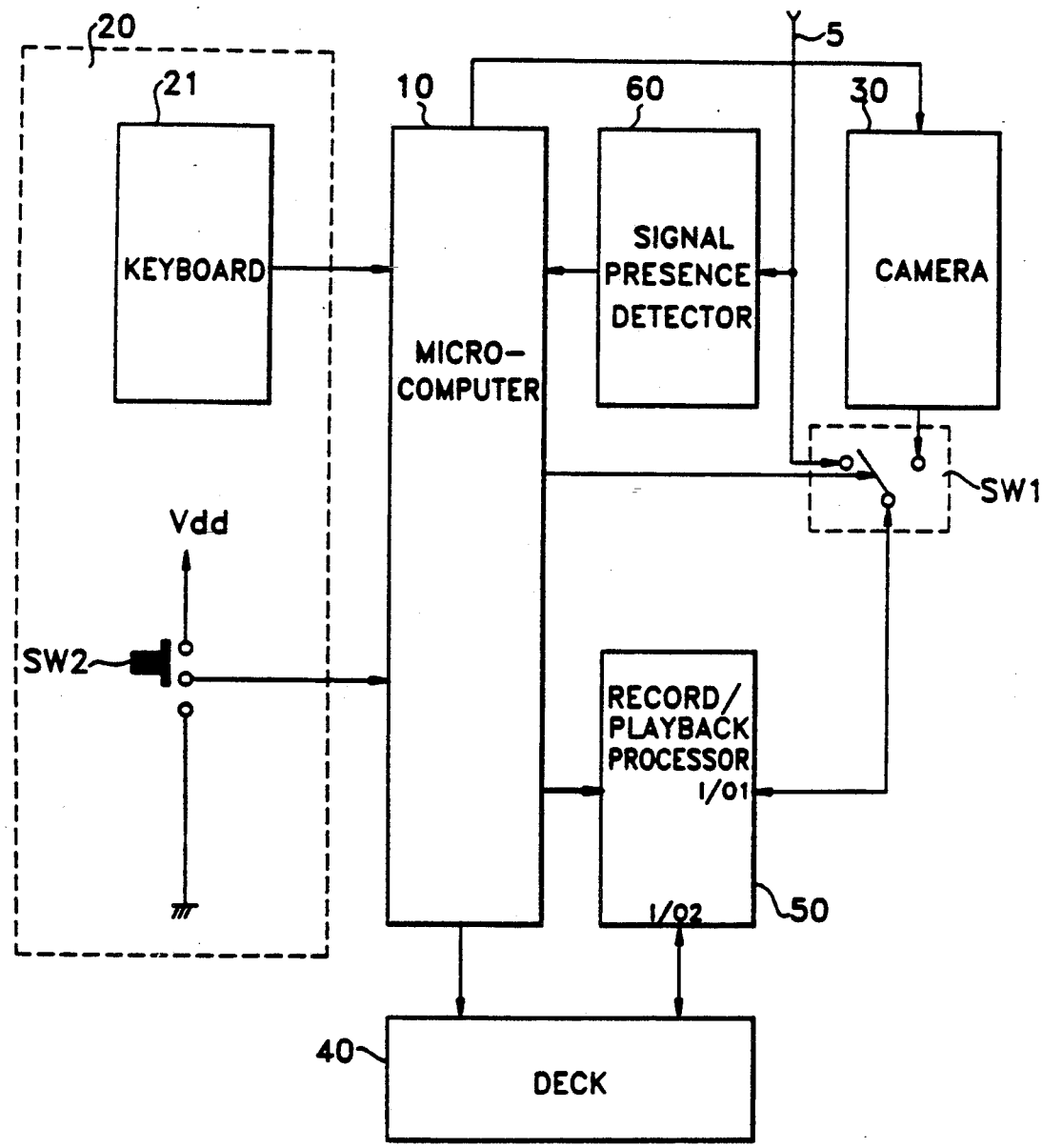
FIG. 2 is a schematic system block diagram for executing the flowchart shown in FIG. 1.

FIG. 2, which illustrates a system for executing the flowchart shown in FIG. 1, is a schematic block diagram of a camcorder, i.e., a VCR provided with a camera. The description of the present invention will begin with a discussion of the camcorder of FIG. 2.

An input device 20 acting as input means for applying a user-designated command comprises a keypad 21 for providing general operation commands from the user to a microcomputer 10 in the form of key data, and a selection switch SW2 for supplying a camera/VCR mode (hereinafter referred to as a "CAM/VCR mode") selection signal to microcomputer 10 generated by the user. If the output of selection switch SW2 is high, then the operational mode of the camcorder is set to a camera mode, while the VCR mode is set when the output of switch SW2 is low.

Microcomputer 10 controls a camera 30, a deck 40, a control switch SW1, and a record/playback processor 50, all shown in FIG. 2, in response to the signals output from both selection switch SW2 and keypad 21 of input device 20. Microcomputer 10 advantageously controls peripheral circuits (not shown in the drawing) of the camcorder.

The camera 30 operates under the control of microcomputer 10 to convert the optical image corresponding to an object into a video signal, which serves as a video signal source in the present embodiment. A signal presence detector 60 detects the presence of a video signal at an input/output terminal 5 so as to supply the resultant information to the microcomputer 10 in the form of a logic signal. Under the control of microcomputer 10, control switch SW1 connects the first input/output terminal I/O1 of record/playback processor 50 to either the output terminal of camera 30 or to input/output terminal 5 so as to control the signal transmission path.

Under the control of microcomputer 10, record/playback processor 50 processes for recording either the output video signal of camera 30 or an external video signal applied to input/output terminal 5, each of which advantageously can be input through control switch SW1 to input/output terminal I/O1, and then supplies the processed video signal for recording to deck 40 through the second input/output terminal I/O2. Alternatively, record/playback processor 50 processes a read out video signal for playback, and subsequent recording, which is applied to the second input/output terminal I/O2 from deck 40 and then transmits this processed video signal to control switch SW1 through the first input/output terminal I/O2.

In addition, under the control of microcomputer 10, deck 40 drives the recording medium located therein, and records the video signal, which is applied from the second input/output terminal I/O2 of record/playback processor 50 onto the recording medium as it is driven, or reads out the recorded video signal from the recording medium as it is driven to supply the second input/output terminal I/O2 of record/playback processor 50 with the read out video signal.

A more detailed explanation of the operation the recording/reproducing system according to the present invention will now be given while referring to the flowchart shown in FIG. 1 in conjunction with the block diagram illustrated in FIG. 2. The process illustrated in the flowchart of FIG. 1 is executed by the operation of microcomputer 10 shown in the block diagram of FIG. 2. Microcomputer 10 advantageously is provided with a ROM, in which the control program for executing the whole process shown in FIG. 1 is stored, a RAM, a variety of registers and operational buffers.

When power is supplied, microcomputer 10 initializes the system and sets a still mode flag allotted to the register incorporated therein to set up a still mode during step 101. After execution of step 101, microcomputer 10 determines the logic state of the CAM/VCR mode selection signal, i.e., the output of selection switch SW2, to determine whether the current state is for camera mode (logic state="1") or for VCR mode (logic state="0") during step 102.

If the logic state in step 102 designates the camera mode of operation, then microcomputer 10 controls control switch SW1 so as to connect the first input/output terminal I/O1 of record/playback processor 50 to the output terminal of camera 30, and sets deck 40 to a stand-by recording mode during step 103. After execution of step 103, microcomputer 10 controls camera 30 to operate and controls deck 40 in the standby state to record, and controls record/playback processor 50 to record during step 104.

If the logic state determined in step 102 designates the VCR mode, microcomputer 10 determines whether or not key data designating the playback mode has been input from keypad 21, and if not, returns to step 101. If key data designating the playback mode has been input, as determined during step 105, then microcomputer 10 controls control switch SW1 so as to connect the first input/output terminal I/O1 of record/playback processor 50 to input/output terminal 5, and then also controls record/playback processor 50 and deck 40 so that both perform a playback operation during step 106.

After execution of step 106, microcomputer 10 determines during step 107 whether or not key data designating the still mode has been input from keypad 21 and, if not, then returns to step 106. For a "YES" condition in step 107, the loop defined by steps 108 and 109 is performed. Preferably, microcomputer 10 controls deck 40 to repeatedly read out a viewing block of the driven recording medium during step 108. After execution of step 108, microcomputer 10 stands by until after key data designating the dubbing mode has been input during step 109.

The microcomputer 10 then controls deck 40 during step 110 to keep deck 40 in a temporary still state after the input of key data designating that the dubbing mode of operation is desired. After execution of step 110, microcomputer 10 verifies the logic state of an output signal from signal presence detector 60 and determines whether a video signal is being input from an external source through input/output terminal 5 during step 111. If and when there is a signal in the previous step 111, the microcomputer verifies the logic state of the CAM/VCR mode selection signal, which is output by selection switch SW2, during step 112.

If the CAM/VCR mode selection signal is high in step 112, i.e., the camera mode, then microcomputer 10 controls control switch SW1, regardless of whether a video signal is input at input/output terminal 5 in step 111, to connect the first input/output terminal I/O1 of record/playback processor 50 to the output terminal of camera 30 during step 113.

On the other hand, if and when the CAM/VCR mode selection signal is low, i.e., the VCR mode, then microcomputer 10 controls control switch SW1 to connect the first input/output terminal I/O1 of record/playback processor 50 to input/output terminal 5 during step 114. However, when no video signal is being input through input/output terminal 5 during step 111, the microcomputer 10 controls control switch SW1 without regard to the logic state of the output signal from selection switch SW2, thereby connecting the first input/output terminal I/O1 of record/playback processor 50 to the output terminal of camera 30.

After execution of either step 113 or step 114, microcomputer 10 determines whether or not key data releasing the temporary still mode of deck 40 has been input and, if not, microcomputer returns to step 110 when step 115 is executed. For a "YES" condition during step 115, microcomputer 10 then controls both deck 40 and record/playback processor 50 to operate during step 116, thereby performing the dubbing function.

After execution of step 116, microcomputer 10 inspects the logic state of the output signal from selection switch SW2, and if it has been changed, microcomputer 10 returns to step 112 when step 117 is executed. If and when the state is unchanged during step 117, then microcomputer 10 determines whether or not key data for dubbing removal from keypad 21 has been input and, if not, then microcomputer 10 returns to step 116 when step 118 is executed. For a "YES" condition during step 118, the microcomputer 10 controls deck 40, record/playback processor 50 and camera 30 to cease operation during step 119.

As explained above, during steps 111 through step 114, either an output video signal from camera 30 or an external video signal from input/output terminal 5 is automatically selected according to the existence of a video signal input from an external source to input/output terminal 5 and a user-designated CAM/VCR mode selection. In other words, a video signal from camera 30 is automatically selected in the event that no external video signal input is provided to input/output terminal 5. However, if an external video signal is provided to input/output terminal 5 and the user designates the camera mode, then the output of camera 30 is selected. When the VCR mode is designated by the user and an external video signal is supplied to input/output terminal 5, then the external video signal at input/output terminal 5 is selected. In addition, when the present invention is applied in a common VCR, a broadcast receiving apparatus comprising a tuner advantageously can serve as the video signal source.

The present invention has an advantage, as was explained and described, whereby, during a dubbing operation, either one of an external video signal or the output of a video signal source is automatically selected according to the presence or absence of an external video signal input and the input selection command of a user, to thereby prevent the formation of a section of the recording medium lacking a signal because only noise is recorded.

It will be appreciated that a camcorder incorporating the present invention permits the output of a camera portion thereof to be recorded while the camcorder is performing a dubbing operation.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of automatically selecting a video signal during dubbing operations in an image record/playback system having a video signal source, said method comprising the steps of:
   recognizing a dubbing mode request;
   selecting one of a source video signal provided by a video signal source and an external video signal provided by an external source based on a signal selection request of a user and the presence of said external video signal in response to said dubbing mode request; and
   recording said selected video signal.

2. A method of automatically selecting a video signal during dubbing operations according to claim 1 wherein said selecting step further comprises a step of automatically selecting said source video signal of said video signal source without regard to said signal selection request of said user in the absence of said external video signal.

3. A method of automatically selecting a video signal during dubbing operations according to claim 1, wherein said selecting step further comprises the step of setting a selected one of a first exclusive mode for recording said source video signal and a second exclusive mode for performing record/playback operations.

4. An apparatus for automatically selecting a video signal during a dubbing operation in an image record/playback system having a video signal source, an input/output terminal for input and output of an external video signal from and to an external source, and a record/playback processor for recording or reproducing an applied video signal, said apparatus comprising:
   input means for applying a command designated by a user;
   path control means for selecting one of a source video signal output by said video signal source and said external video signal applied to said input/output terminal so as to permit said selected video signal to be applied to said record/playback processor;
   a signal presence detector for detecting whether an external video signal applied to said input/output terminal is present in response to a dubbing mode request command applied from said input means; and
   a microcomputer for controlling said path control means based on output signals of said signal presence detector and said input means.

5. An apparatus for automatically selecting a video signal during a dubbing operation according to claim 4, wherein said input means includes a selecting means for selecting one of first and second exclusive processing modes associated with said video signal source and said input/output terminal, respectively.

6. An apparatus for automatically selecting a video signal during dubbing operations according to claim 5, wherein said microcomputer controls said path control means without regard to output signals from said selecting means in response to an indication output signal, which signal indicates that no external video signal is present, generated by said signal presence detector to thereby permit said source video signal generated by said video signal source to be applied to said record/playback processor.

7. An apparatus for automatically selecting a video signal during dubbing operations according to claim 4, wherein said video signal source is a camera.

8. An apparatus for automatically selecting a video signal during dubbing operations according to claim 4, wherein said video signal source is a broadcast receiving apparatus.

9. A method of automatically selecting a video signal during dubbing operations in an image record/playback system having a video signal source and a signal presence detector for detecting the presence of at least an external video source, said method comprising the steps of:
   (a) recognizing a dubbing mode request;
   (b) when both a source video signal provided by a video signal source and said external video signal provided by an external source are present, selecting one of said source video signal and said external video signal as a selected video signal in response to a signal selection request of a user and the presence of said external video signal in response to said dubbing mode request;
   (c) when said external video signal is absent, automatically selecting said source video signal as said selected video signal without regard to said signal selection request of said user; and (d) recording said selected video signal.

10. A method of automatically selecting a video signal during dubbing operations according to claim 9, wherein said selecting step (b) further comprises the step of setting a selected one of a first exclusive mode for recording said source video signal and a second exclusive mode for performing record/playback operations.

* * * * *